United States Patent
Subramaniyan et al.

(10) Patent No.: US 10,344,604 B2
(45) Date of Patent: Jul. 9, 2019

(54) TURBOMACHINE DIFFUSER INCLUDING FLOW MIXING LOBES AND METHOD

(71) Applicant: GENERAL ELECTRIC COMPANY, Schenectady, NY (US)

(72) Inventors: Moorthi Subramaniyan, Karnataka (IN); Pradeep Patel, Karnataka (IN)

(73) Assignee: General Electric Company, Schenectady, NY (US)

( * ) Notice: Subject to any disclaimer, the term of this patent is extended or adjusted under 35 U.S.C. 154(b) by 415 days.

(21) Appl. No.: 15/159,850

(22) Filed: May 20, 2016

(65) Prior Publication Data

US 2016/0341053 A1  Nov. 24, 2016

(30) Foreign Application Priority Data

May 22, 2015 (IN) .......................... 2581/CHE/2015

(51) Int. Cl.
| | |
|---|---|
| F01D 9/02 | (2006.01) |
| F01D 9/04 | (2006.01) |
| F02C 3/04 | (2006.01) |
| F01D 25/30 | (2006.01) |
| F01D 5/02 | (2006.01) |
| F04D 19/00 | (2006.01) |

(52) U.S. Cl.
CPC ............. *F01D 9/041* (2013.01); *F01D 5/021* (2013.01); *F01D 25/30* (2013.01); *F02C 3/04* (2013.01); *F04D 19/002* (2013.01); *F01D 9/02* (2013.01); *F05D 2220/32* (2013.01); *F05D 2240/127* (2013.01); *F05D 2240/35* (2013.01); *F05D 2270/17* (2013.01)

(58) Field of Classification Search
CPC . F01D 9/041; F01D 9/02; F01D 25/30; F05D 2240/127; F05D 2270/17
See application file for complete search history.

(56) References Cited

U.S. PATENT DOCUMENTS

| | | | | |
|---|---|---|---|---|
| 2,352,790 A | * | 7/1944 | Jordan | ................... B64D 33/08 244/53 B |
| 2,650,752 A | * | 9/1953 | Hoadley | ................. B64C 23/06 138/37 |

(Continued)

FOREIGN PATENT DOCUMENTS

| | | |
|---|---|---|
| CN | 103195572 A | 7/2013 |
| EP | 2484898 A1 | 8/2012 |

(Continued)

OTHER PUBLICATIONS

PCT Search Report and Written Opinion issued in connection with Related PCT Application No. PCT/PL2015/050017 dated Jan. 20, 2016.

(Continued)

*Primary Examiner* — Carlos A Rivera
(74) *Attorney, Agent, or Firm* — Frank A. Landgraff

(57) ABSTRACT

A turbomachine diffuser includes a body having an inner surface defining a diffuser flow path, a plurality of stationary struts extending from the inner surface, and a plurality of flow mixing lobes arranged in an annular array on the inner surface. The plurality of flow mixing lobes is configured and disposed to guide a substantially high momentum flow toward the inner surface of the body.

20 Claims, 5 Drawing Sheets

(56) References Cited

U.S. PATENT DOCUMENTS

| | | | | |
|---|---|---|---|---|
| 2,844,001 | A * | 7/1958 | Alford | F01D 5/145 138/40 |
| 4,836,473 | A * | 6/1989 | Aulehla | B64C 21/00 244/130 |
| 4,971,768 | A | 11/1990 | Ealba et al. | |
| 5,058,837 | A | 10/1991 | Wheeler | |
| 5,088,892 | A | 2/1992 | Weingold et al. | |
| 6,896,475 | B2 * | 5/2005 | Graziosi | F01D 25/305 415/1 |
| 7,914,259 | B2 | 3/2011 | Godsk | |
| 8,087,250 | B2 | 1/2012 | Gutmark et al. | |
| 8,257,036 | B2 | 9/2012 | Norris | |
| 8,544,799 | B2 * | 10/2013 | Da Silva | B64C 23/06 244/130 |
| 2004/0091350 | A1 | 5/2004 | Graziosi et al. | |
| 2008/0121301 | A1 * | 5/2008 | Norris | F01D 25/30 138/39 |
| 2008/0267762 | A1 * | 10/2008 | Jain | B64D 33/02 415/2.1 |
| 2009/0263243 | A1 * | 10/2009 | Little | F01D 25/14 415/216.1 |
| 2010/0226767 | A1 * | 9/2010 | Becker | F01D 9/02 415/207 |
| 2012/0325325 | A1 | 12/2012 | Quackenbush et al. | |
| 2013/0168502 | A1 * | 7/2013 | Da Silva | B64D 41/00 244/53 B |
| 2014/0010638 | A1 | 1/2014 | Perrot et al. | |
| 2017/0114794 | A1 * | 4/2017 | Duong | F04D 29/441 |
| 2018/0156239 | A1 * | 6/2018 | Zielinger | F01D 5/143 |

FOREIGN PATENT DOCUMENTS

| | | |
|---|---|---|
| JP | 08260905 A | 10/1996 |
| JP | 5422470 B2 | 2/2014 |

OTHER PUBLICATIONS

Machine Translation and First Office Action and Search issued in connection with corresponding CN Application No. 201610336580.0 dated Jan. 2, 2019.

* cited by examiner

TURBOMACHINE DIFFUSER INCLUDING FLOW MIXING LOBES AND METHOD

BACKGROUND

The subject matter disclosed herein relates to the art of turbomachines and, more particularly, to a turbomachine diffuser including flow mixing lobes.

Gas turbomachines typically include a compressor portion, a turbine portion, and a combustor assembly. The combustor assembly mixes fluid from the compressor portion with a fuel to form a combustible mixture. The combustible mixture is combusted forming hot gases that pass along a hot gas path of the turbine portion. The turbine portion includes a number of stages having airfoils mounted to rotors that convert thermal energy from the hot gases into mechanical, rotational energy. Additional fluid from the compressor is passed through the airfoils and other sections of the turbine portion for cooling purposes. Hot gases pass, as exhaust gases, from the turbine portion into an exhaust diffuser. The exhaust diffuser is geometrically configured to rapidly decrease the kinetic energy of flow and increase static pressure recovery within the exhaust diffuser. The exhaust diffuser typically includes one or more stationary struts for mechanical support. The exhaust gases may pass from the exhaust diffuser to a downstream component.

BRIEF DESCRIPTION

According to one aspect of an exemplary embodiment, a turbomachine diffuser includes a body having an inner surface defining a diffuser flow path, a plurality of stationary struts extending from the inner surface, and a plurality of flow mixing lobes arranged in an annular array on the inner surface. The plurality of flow mixing lobes is configured and disposed to guide a substantially high momentum flow toward the inner surface of the body.

According to another aspect of an exemplary embodiment, a turbomachine includes a compressor portion, and a turbine portion operatively connected to the compressor portion. The turbine portion includes an outlet. A combustor assembly including, at least one combustor, is fluidically connected to the compressor portion and the turbine portion. A diffuser is fluidically connected to the outlet of the turbine portion. The diffuser includes a body having an inner surface defining a diffuser flow path, a plurality of stationary struts extending from the inner surface, and a plurality of flow mixing lobes arranged in an annular array on the inner surface. The plurality of flow mixing lobes is configured and disposed to guide a substantially high momentum flow toward the inner surface of the body.

According to yet another aspect of an exemplary embodiment, a method of passing exhaust gases from a turbomachine into a diffuser includes passing hot gases toward an outlet of a turbine portion of the turbomachine, delivering the hot gases into an inlet of the diffuser, directing a portion of the hot gases toward a plurality of flow mixing lobes arranged circumferentially about an inner surface of the diffuser, forming the portion of the hot gases into a substantially high momentum flow, guiding the substantially high momentum flow toward the inner surface of the diffuser, and mixing the substantially high momentum flow with a boundary layer flow passing along the inner surface.

These and other advantages and features will become more apparent from the following description taken in conjunction with the drawings.

BRIEF DESCRIPTION OF DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
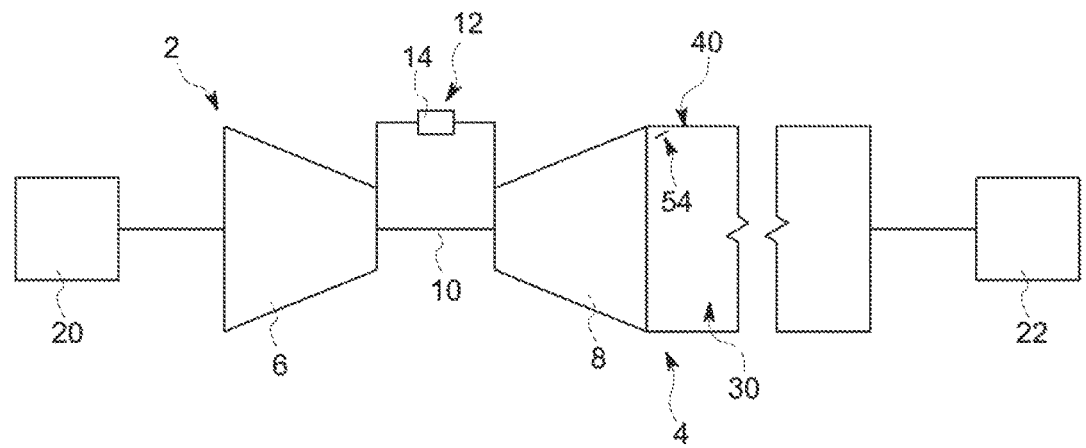
FIG. 1 depicts a schematic view of a turbomachine system including an exhaust diffuser having flow mixing lobes, in accordance with an exemplary embodiment.

A turbomachine system, in accordance with an exemplary embodiment, is indicated generally at 2, in FIG. 1. Turbomachine system 2 includes a turbomachine 4 having a compressor portion 6 operatively connected to a turbine portion 8 through a common compressor/turbine shaft 10. A combustor assembly 12 is fluidically connected between compressor portion 6 and turbine portion 8. Combustor assembly 12 includes at least one combustor 14 that directs products of combustion along a hot gas path (also not separately labeled) of turbine portion 8. An intake system 20 is fluidically connected to an inlet (not separately labeled) of compressor portion 6. A load 22 is mechanically linked to turbomachine 4.

In operation, air is passed through intake system 20 into compressor portion 6. Intake system 20 may condition the air by, for example, lowering humidity, altering temperature, and the like. The air is compressed through multiple stages of compressor portion 6 and passed to turbine portion 8 and combustor assembly 12. The air is mixed with fuel, diluents, and the like, in combustor 14 to form a combustible mixture. The combustible mixture is passed from combustor 14 into turbine portion 8 via a transition piece (not shown) as hot gases. The hot gases flow along the hot gas path of turbine portion 8 and pass as exhaust into an exhaust diffuser 30. Exhaust diffuser 30 is geometrically configured to rapidly decrease kinetic energy of exhaust gases as well as increase static pressure recovery prior to delivery to a downstream device (not shown). The downstream device may direct the exhaust gases to ambient, or extract additional energy that may be used for other purposes.

Figure 2:
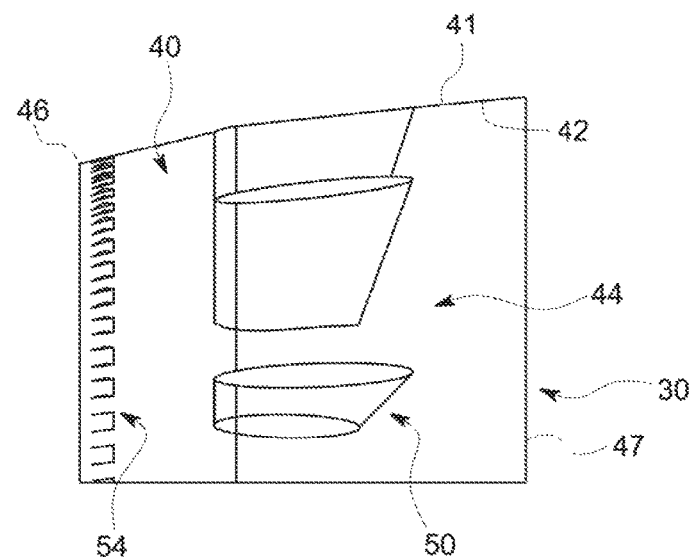
FIG. 2 depicts a partial cross-sectional side view of the diffuser of FIG. 1.

As shown in FIG. 2, exhaust diffuser 30 includes a body 40 having an outer surface 41 and an inner surface 42 that defines a diffuser flow path 44. Exhaust diffuser 30 includes an inlet 46 fluidically coupled to an outlet (not separately labeled) of turbine portion 8 and an outlet 47. Exhaust diffuser 30 is also shown to include a plurality of stationary struts, one of which is indicated at 50, extending radially inwardly to diffuser flow path 44 from inner surface 42. Stationary struts 50 condition exhaust gases flowing along diffuser flow path 44 toward outlet 47.

In accordance with an exemplary embodiment, exhaust diffuser 30 includes a plurality of flow mixing lobes, one of which is indicated at 54, mounted to inner surface 42. In accordance with an aspect of an exemplary embodiment, flow mixing lobes 54 may be arranged downstream of inlet 46 a distance between about 0.05 times a last stage blade height and about 10 times the last stage blade height. In an exemplary aspect shown, flow mixing lobes 54 may be arranged downstream of inlet 46 and upstream of struts 50. In accordance with another aspect of an exemplary embodiment, flow mixing lobes 54 may be arranged about 2-inches (5.08-cm) downstream of inlet 46. In accordance with yet another aspect of an exemplary embodiment, flow mixing lobes 54 may be arranged about 1.50-inches (3.81-cm) downstream of inlet 46. Of course, it should be understood that the position of flow mixing lobes 54 may vary. Further, it should be understood that flow mixing lobes may be arranged downstream of struts 50.

Figure 3:
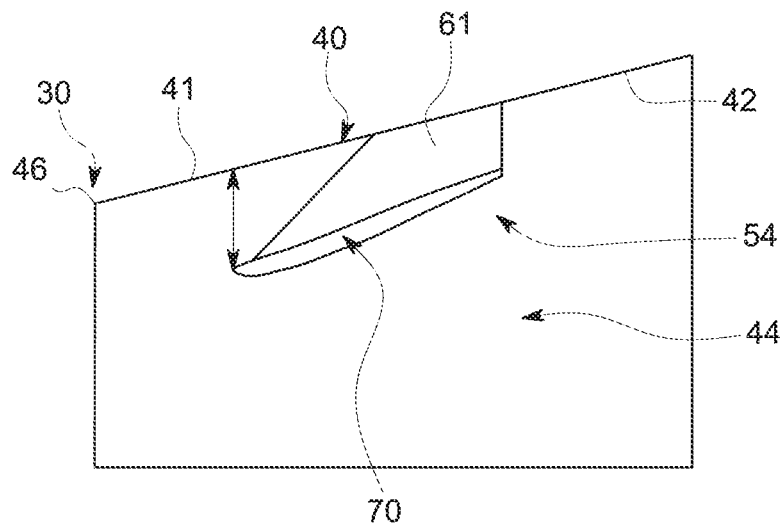
FIG. 3 depicts a flow mixing lobe mounted to an inner surface of the diffuser of FIG. 1.
Figure 4:
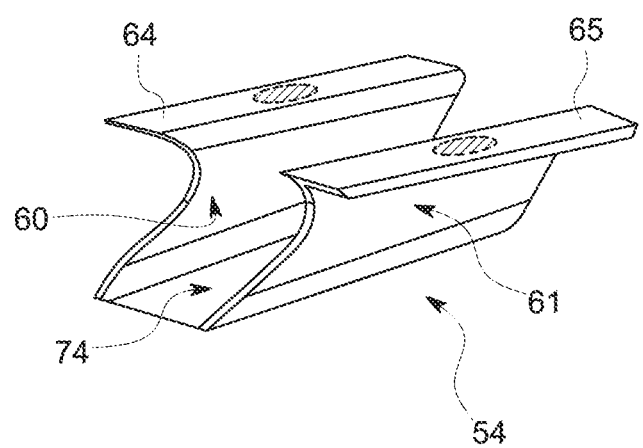
FIG. 4 depicts a perspective view of the flow mixing lobe of FIG. 3.

As shown in FIGS. 3 and 4, flow mixing lobes 54 include a first lobe member 60 and a second lobe member 61. Each lobe member 60 and 61 extends substantially perpendicularly outwardly from inner surface 42. First lobe member 60 includes a first base section 64 and second lobe member 61 includes a second base section 65. First base section 64 projects outwardly of first lobe member 60 in a first direction and second base section 65 projects outwardly of second lobe member 61 in a second direction that is opposite the first direction. First and second base sections 64 and 65 provide an attachment interface between respective ones of first and second lobe members 60 and 61 and inner surface 42.

In further accordance with an exemplary embodiment, flow mixing lobes 54 include an airfoil portion 70 extending between first and second lobe member 60 and 61. Airfoil portion 70 is spaced from first and second base sections 64 and 65 such that, when attached to inner surface 42, a channel 74 is formed. Channel 74 receives a portion of exhaust gases passing from turbine portion 8. In accordance with an aspect of an exemplary embodiment, channel 74 guides a portion of a high momentum flow passing from turbine portion 6 radially outwardly toward inner surface 42. More specifically, airfoil portion 70 directs the portion of the substantially high momentum flow radially outwardly toward inner surface 42 thereby generating flow vortices. The flow vortices reduce boundary layer growth at inner surface 42 resulting in a reduction in flow separation. The exemplary embodiments thus improve pressure recovery in exhaust diffuser 30 that leads to an enhancement in overall system efficiency. At this point, it should be understood that the term "substantially high momentum flow" describes a flow having a velocity of about 1000 ft/sec (about 305 m/s) or greater.

Figure 5:
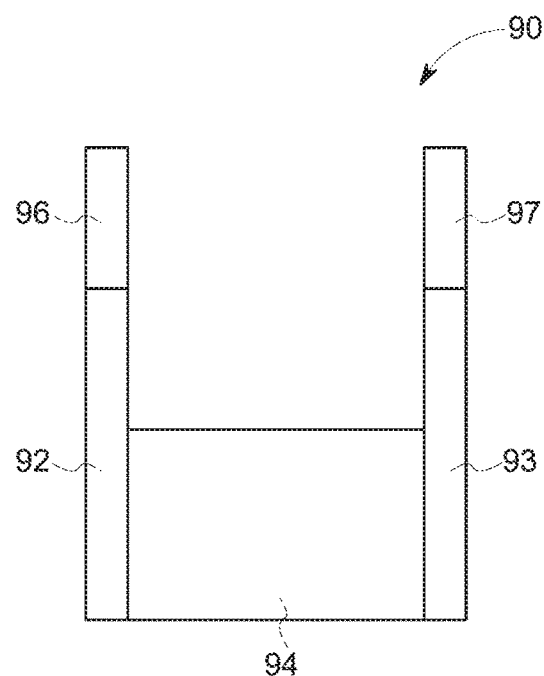
FIG. 5 depicts a flow mixing lobe, in accordance with another aspect of an exemplary embodiment.
Figure 6:
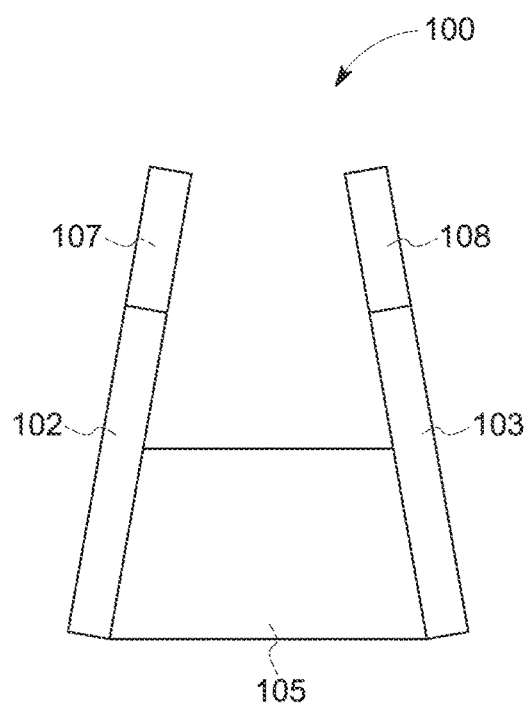
FIG. 6 depicts a flow mixing lobe, in accordance with yet another aspect of an exemplary embodiment.

FIG. 5 depicts a flow mixing lobe 90 in accordance with another aspect of an exemplary embodiment. Flow mixing lobe 90 includes first and second lobe portions 92 and 93 joined through an airfoil portion 94. Each lobe portion 92 and 93 includes a corresponding terminal end portion 96 and 97 that directly interfaces with inner surface 42 of exhaust diffuser 30. FIG. 6 depicts a flow mixing lobe 100 including first and second lobe members 102 and 103 joined by an airfoil portion 105. In the exemplary aspect shown, first and second lobe members 102 and 103 include corresponding terminal end portions 107 and 108 that are angled inwardly toward each other.

Figure 7:
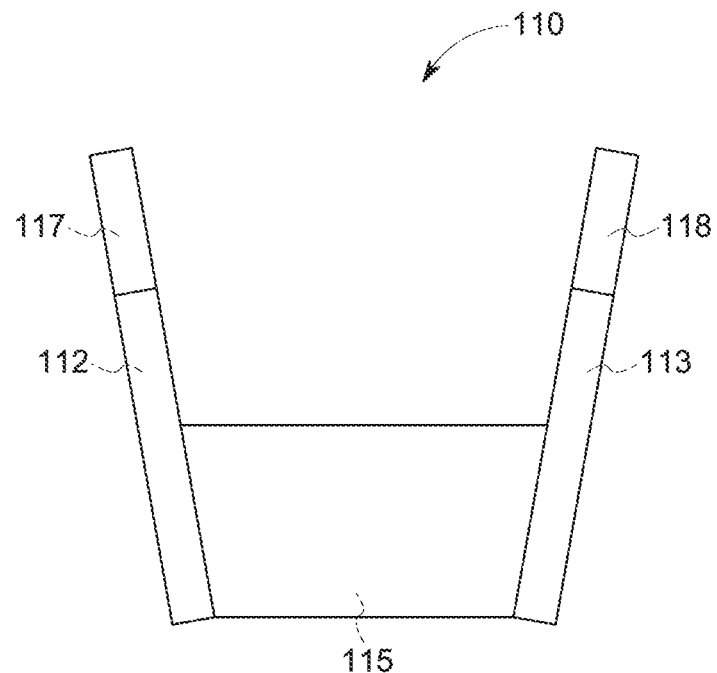
FIG. 7 depicts a flow mixing lobe, in accordance with still yet another aspect of an exemplary embodiment
Figure 8:
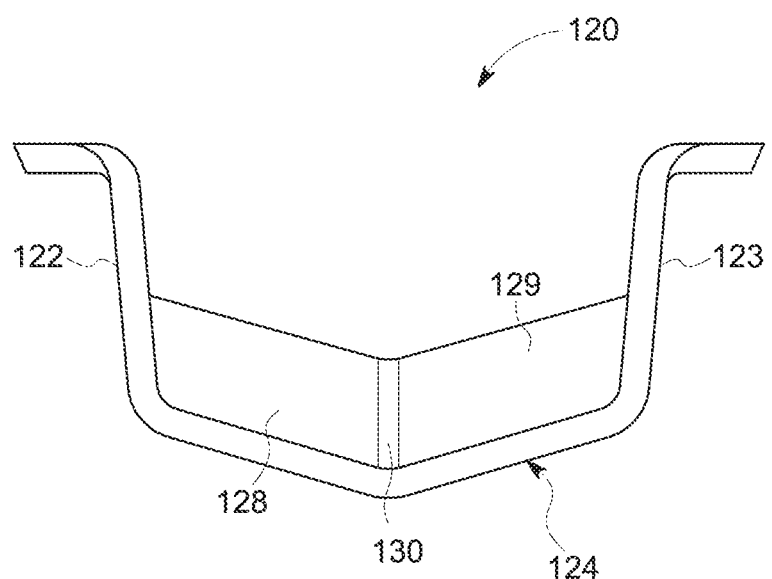
FIG. 8 depicts a flow mixing lobe, in accordance with yet still another aspect of an exemplary embodiment.
Figure 9:
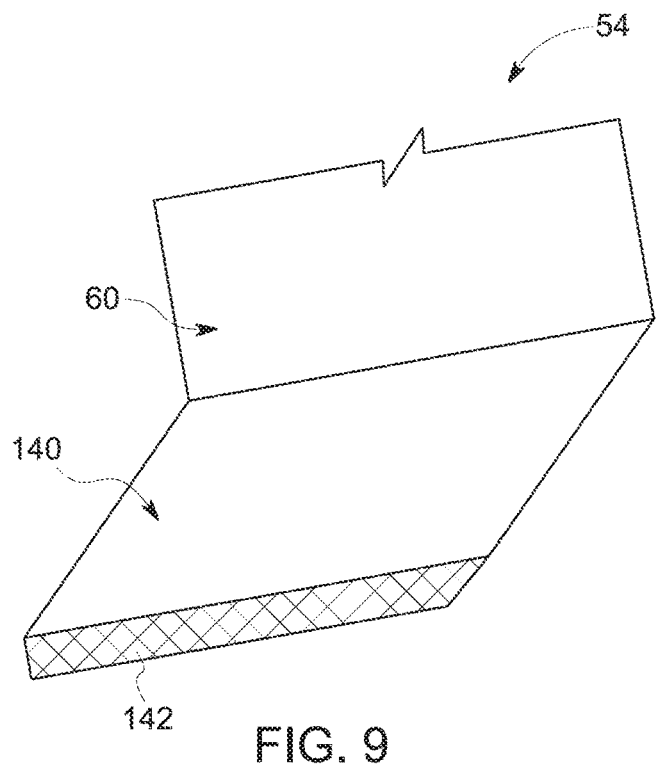
FIG. 9 depicts a cross-sectional view of a flow mixing lobe including an airfoil portion, in accordance with an aspect of an exemplary embodiment.
Figure 10:
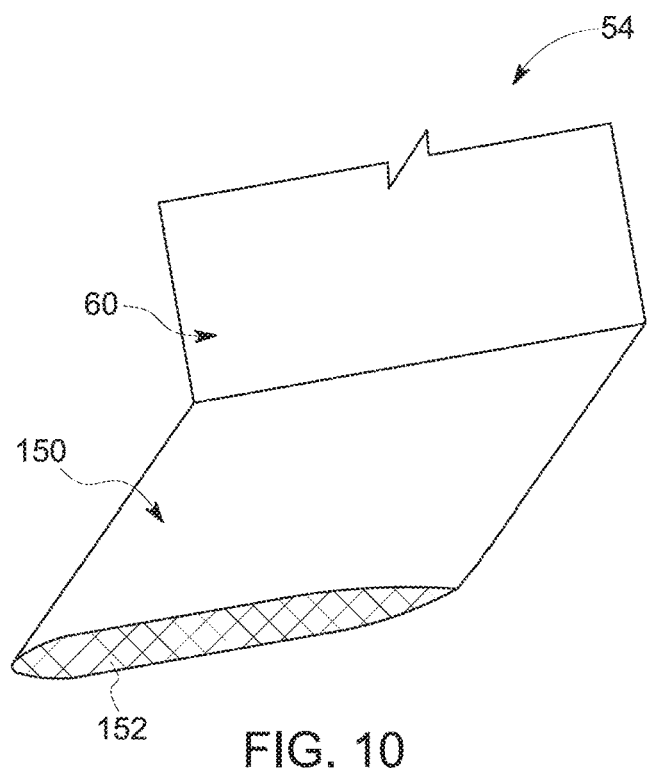
FIG. 10 depicts a cross-sectional view of a flow mixing lobe including an airfoil portion, in accordance with another aspect of an exemplary embodiment.

FIG. 7 depicts a flow mixing lobe 110 including first and second lobe members 112 and 113 joined by an airfoil portion 115. In the exemplary aspect shown, first and second lobe members 112 and 113 including corresponding terminal end portions 117 and 118 that are angled outwardly away from one another. FIG. 8 depicts a flow mixing lobe 120 having first and second lobe members 122 and 123 joined by an airfoil portion 124. In the exemplary aspect shown, airfoil portion 124 includes first and second airfoil members 128 and 129 that extend at an angle from corresponding ones of first and second lobe members 122 and 123 and are joined at an angled portion 130. FIG. 9 depicts a flow mixing lobe 140 including an airfoil portion 142 having a generally rectangular cross-section (not separately labeled). FIG. 10 depicts a flow mixing lobe 150 including an airfoil portion 152 having a curvilinear cross-section (also not separately labeled).

The Applicant respectfully submits that the term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the exemplary embodiment. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A turbomachine diffuser comprising:
    a body having an inner surface defining a diffuser flow path;
    a plurality of stationary struts extending from the inner surface; and
    a plurality of flow mixing lobes arranged in an annular array on the inner surface, wherein the plurality of flow mixing lobes is configured and disposed to guide a substantially high momentum flow toward the inner surface of the body, each of the plurality of flow mixing lobes including:
        a first lobe member and a second lobe member, each of the first and second lobe members spaced and extending from the inner surface into the diffuser flow path; and an airfoil portion extending between the first and second lobe members;
wherein the airfoil portion, the first lobe member and second lobe member form a flow channel through the respective flow mixing lobe.

2. The turbomachine diffuser as claimed in claim 1, wherein the first and second lobe members of at least one of the flow mixing lobes extends substantially perpendicularly from the inner surface.

3. The turbomachine diffuser as claimed in claim 1, wherein the first and second lobe members of at least one of the flow mixing lobes extend in a converging or diverging orientation from the inner surface.

4. The turbomachine diffuser as claimed in claim 1, wherein the airfoil portion includes a substantially rectangular cross-section.

5. The turbomachine diffuser as claimed in claim 1, wherein the airfoil portion includes first and second airfoil members extending from corresponding ones of the first and second lobe members, the first and second airfoil members joined at a non-planar angle.

6. The turbomachine diffuser as claimed in claim 1, wherein at least one of the first and second lobe members includes a base section extending circumferentially outwardly of the one of the first and second lobe members, the base section being joined to the inner surface of the body.

7. The turbomachine diffuser as claimed in claim 6, wherein the base section extends substantially perpendicularly outwardly of the one of the first and second lobe members away from the other of the first and second lobe members.

8. The turbomachine diffuser as claimed in claim 1, wherein the first and second lobe members of at least one of the flow mixing lobes extend in parallel orientation from the inner surface.

9. The turbomachine diffuser as claimed in claim 1, wherein the first and second lobe members of at least one of the flow mixing lobes extend in parallel orientation from the inner surface.

10. The turbomachine diffuser as claimed in claim 1, wherein the airfoil portion includes a curvilinear cross-section.

11. The turbomachine diffuser as claimed in claim 1, wherein the airfoil portion includes an inner airfoil surface defining a wall of the channel, wherein the inner airfoil surface is planar.

12. The turbomachine diffuser as claimed in claim 1, wherein the airfoil portion is arranged to direct the substantially high momentum flow radially outward toward the inner surface of the body.

13. The turbomachine diffuser as claimed in claim 1, wherein each of the first and second lobe members include a first end adjacent the inner wall of the body and an opposing second end adjacent the airfoil portion, and wherein a length of the first end is less than a length of the opposing second end.

14. A turbomachine comprising:
a compressor portion;
a turbine portion operatively connected to the compressor portion, the turbine portion including an outlet;
a combustor assembly including at least one combustor fluidically connected to the compressor portion and the turbine portion; and
a diffuser fluidically connected to the outlet of the turbine portion, the diffuser comprising:
a body having an inner surface defining a diffuser flow path;
a plurality of stationary struts extending from the inner surface; and
a plurality of flow mixing lobes arranged in an annular array on the inner surface, wherein the plurality of flow mixing lobes is configured and disposed to guide a substantially high momentum flow toward the inner surface of the body, each of the plurality of flow mixing lobes including:
a first lobe member and a second lobe member, each of the first and second lobe members spaced and extending from the inner surface into the diffuser flow path; and
an airfoil portion extending between the first and second lobe members;
wherein the airfoil portion, the first lobe member and second lobe member form a flow channel through the respective flow mixing lobe.

15. The turbomachine as claimed in claim 14, the first and second lobe members of at least one of the flow mixing lobes extends substantially perpendicularly from the inner surface.

16. The turbomachine as claimed in claim 14, wherein the first and second lobe members of at least one of the flow mixing lobes extend in a converging or diverging orientation from the inner surface.

17. The turbomachine as claimed in claim 14, wherein the airfoil portion includes first and second airfoil members extending from corresponding ones of the first and second lobe members, the first and second airfoil members joined at a non-planar angle.

18. The turbomachine as claimed in claim 14, wherein at least one of the first and second lobe members includes a base section extending circumferentially outwardly of the one of the first and second lobe members, the base section being joined to the inner surface of the body.

19. A method of passing exhaust gases from a turbomachine into a diffuser, the method comprising:
passing hot gases toward an outlet of a turbine portion of the turbomachine;
delivering the hot gases into an inlet of the diffuser;
directing a portion of the hot gases across a respective airfoil portion of a plurality of flow mixing lobes arranged circumferentially about an inner surface of the diffuser and through respective flow channels formed by each of the plurality of flow mixing lobes, wherein each of the respective flow channels is formed by the respective airfoil portion extending between a first lobe member and a second lobe member, each of the first and second lobe members spaced and extending from the inner surface into the diffuser flow path;
forming the portion of the hot gases into a substantially high momentum flow;
guiding the substantially high momentum flow toward the inner surface of the diffuser; and
mixing the substantially high momentum flow with a boundary layer flow passing along the inner surface.

20. The method as claimed in claim 19, wherein guiding the substantially high momentum flow toward the inner surface of the diffuser includes directing a flow passing from an outlet of a turbine portion of a turbomachine across an airfoil portion of a plurality of flow mixing lobes.

* * * * *